United States Patent
Levine (10) Patent No.: US 9,774,639 B2
(45) Date of Patent: Sep. 26, 2017

(54) SYSTEM AND METHOD FOR MULTI-PARTY COMMUNICATION

(71) Applicant: Comet Capital, LLC, Sarasota, FL (US)

(72) Inventor: Lawrence T. Levine, Sarasota, FL (US)

(73) Assignee: COMET CAPITAL, LLC, Sarasota, FL (US)

(*) Notice: Subject to any disclaimer, the term of this patent is extended or adjusted under 35 U.S.C. 154(b) by 613 days.

(21) Appl. No.: 13/837,478

(22) Filed: Mar. 15, 2013

(65) Prior Publication Data

US 2014/0282094 A1 Sep. 18, 2014

(51) Int. Cl.
*H04L 29/06* (2006.01)
*H04W 64/00* (2009.01)
(Continued)

(52) U.S. Cl.
CPC .......... *H04L 65/403* (2013.01); *H04L 67/306* (2013.01); *H04M 3/563* (2013.01);
(Continued)

(58) Field of Classification Search
CPC .............................. H04L 65/403; G06F 15/16
See application file for complete search history.

(56) References Cited

U.S. PATENT DOCUMENTS

| 5,828,839 A * | 10/1998 | Moncreiff | 709/204 |
| 2007/0230385 A1* | 10/2007 | Gaw | 370/310.2 |

(Continued)

FOREIGN PATENT DOCUMENTS

IN 00435DE2008 A 4/2009

OTHER PUBLICATIONS

Roadsal West, "CB Radio Chat & Scanner Radio Android App Review", Dec. 4, 2012, https://www.youtube.com/watch?v=YJfQ-fL0tBw.*

(Continued)

*Primary Examiner* — Jeanette J Parker
(74) *Attorney, Agent, or Firm* — Timothy J. Bechen; Bechen PLLC (57) ABSTRACT

A system and method provides for multi-party communication including engaging a network communication engine from a mobile communication interface and providing a user identification and a location indicator to the network communication engine. The method and system further includes receiving in the mobile communication interface a plurality of communication channels based on at least one of: the user identification and the location indicator and in response to a user selection of a selected communication channel, transmitting a channel engagement request to the network communication engine requesting connection of the user to the selected communication channel. The method and system further includes engaging in muted bi-directional communication with a plurality of additional users across the selected communication channel, wherein muted bi-directional communication includes user engagement of an open channel engagement command for communication input across the channel and the input transmitted across the channel only during the open channel engagement command.

14 Claims, 6 Drawing Sheets

(51) Int. Cl.
  *H04W 72/04*   (2009.01)
  *H04W 76/00*   (2009.01)
  *H04W 4/02*    (2009.01)
  *H04M 3/56*    (2006.01)
  *H04W 72/02*   (2009.01)
  *H04W 4/20*    (2009.01)
  *H04L 29/08*   (2006.01)

(52) U.S. Cl.
  CPC ............ *H04M 3/564* (2013.01); *H04W 4/02* (2013.01); *H04W 64/00* (2013.01); *H04W 72/0413* (2013.01); *H04W 76/00* (2013.01); *H04L 65/4038* (2013.01); *H04L 67/18* (2013.01); *H04W 4/021* (2013.01); *H04W 4/206* (2013.01); *H04W 72/02* (2013.01)

(56) References Cited

U.S. PATENT DOCUMENTS

2010/0153859 A1* 6/2010 Dawson ............ H04L 65/4015
                                                    715/757
2013/0110921 A1* 5/2013 Logan et al. ................ 709/204

OTHER PUBLICATIONS

CB Radio Chat App, http://www.cbradiochat.net/.*

* cited by examiner

SYSTEM AND METHOD FOR MULTI-PARTY COMMUNICATION

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

The disclosed technology relates generally to communication systems and more specifically to software and hardware based emulation for providing multi-party muted bi-directional communications between geographically distant users.

BACKGROUND

Multi-party communication has long been an enjoyable form of various individuals to share information with each other. Early forms of this communication included citizen band (CB) radios, where users were able to transmit and receive messages over a defined distance. Users could openly talk with other users on various channels, where these channels were dictated by radio frequencies.

A common utilization of this type of multi-party communication was for road travelers, including semi drivers and hobbyists. For instance, truck drivers could share information about traffic issues within a particular distance. Other uses include hobbyists having random conversations with other users from their home radios.

As technology has evolved, so has the ability to enhance these multi-channel communication techniques. One common limitation was requiring users to have CB radios to communicate, thus users had to purchase a radio, then having the radio and antenna installed. One common improvement is the utilization of common radio transmission devices, cellular phones, to generate the communications. U.S. Pat. No. 6,477,366 describes using a cellular telephone, which is a radio transmitter, as a means for generating CB-band communications. This patent technique solved the problem of CB radio equipment, but failed to expand the geographic scope of such communication. This patent technique uses cell phone towers as the repeater to transmit the radio signal to other cellular telephones, but the communicating cellular telephones are required to be within the reach of the same cell phone tower. Therefore, while this technique replaces the CB radio with a cellular telephone, the broadcast range is still significantly reduced.

Further improvements have been attempted, as described in U.S. patent application Ser. No. 12/701,765, Publication No. 2011/0196969. This technique seeks to improve the geographic scope of CB radio communication by engaging the vehicle in-dash communication system with a wireless network connected to a wide area network backbone. This published application fails to improve any functionality of the user interface and user communication experience, rather merely enhances the geographic scope of communication from U.S. Pat. No. 6,477,366 by using the Internet as a communication backbone. The published application provides for all user functionality and interface to be pre-loaded in the vehicle in-dash display. Moreover, the published application provides a direct connection socket for video and audio communication without any management of the communication across the channel. Therefore, in this system with multiple users, concurrent talking will be undetectable, a wall of noise between the users.

A basic tenant of the CB radio communication is the line engagement to speak, but muting or line disengagement when not speaking. This provides for structured communication between the parties as a side benefit of the original limitation of the radio antenna being unable to concurrent transmits and receives. Rather, the published application 2011/0196969 uses the concept of a CB radio as a pretext for seeking establishment of a car-based open socket video chat session.

Therefore, there exists a need for a method and system that both eliminates the equipment requirements for multi-party communication, relying on existing mobile computing platform(s), and expands the geographic scope of true multi-party communication. Moreover, there exists a need for the network-based functionality to enable such multi-party communication maintain a thin client.

BRIEF DESCRIPTION

A system and method provides for multi-party communication including engaging a network communication engine from a mobile communication interface and providing a user identification and a location indicator to the network communication engine. The method and system further includes receiving in the mobile communication interface a plurality of communication channels based on at least one of: the user identification and the location indicator and in response to a user selection of a selected communication channel, transmitting a channel engagement request to the network communication engine requesting connection of the user to the selected communication channel. The method and system further includes engaging in muted bi-directional communication with a plurality of additional users across the selected communication channel, wherein muted bi-directional communication includes user engagement of an open channel engagement command for communication input across the channel and the input transmitted across the channel only during the open channel engagement command.

Further embodiments of the method and system include a mobile computing device performing the step of engaging the network communication engine. Another embodiment of the method and system includes wherein the user identification includes a user login to the mobile communication interface, such that the mobile communication interface includes a plurality of user preferences stored therein.

Further embodiments of the method and system include receiving user communication input via the mobile communication interface to modify the bi-directional communication and transmitting a modify instruction to the network communication engine. In one embodiment, the modify instructions include a squelch instruction, a change channel instruction, and/or an interaction group modification command. In this embodiment, the squelch instructions are predicated on one or more of a distance factor, a contacts factor, an individual user factor, and a reputation score factor.

Further embodiments of the method and system include providing a user communication selection, via the mobile communication interface, to the network communication engine and receiving one or more communication channels based on the user communication selection. In this embodiment, the user communication selection includes users from a contacts list, a location indicator, a proximity distance indicator, a content indicator, and a broadcast indicator.

From the network side, another system and method provides for multi-party communication including receiving, from a user, a user identification from a mobile communication interface, the user identification identifying a user for engaging in multi-party communication and determining at least one communication channel for the user based on the user identification. The method and system includes presenting to the user the communication channel(s) and receiving a user selection of a selected communication channel. Therein, the method and system includes connecting the user to a plurality of other users within the selected communication channel for muted bi-directional communication thereacross, wherein muted bi-directional communication includes transmission of user input across the communication channel in response to receipt of concurrent engagement of an open channel engagement command.

In one embodiment, the method and system includes connecting the user for muted bi-directional communication includes connection via a mobile computing device. The method and system further includes receiving a location indicator from the user and determining the at least one communication channel based on the user location indicator. The user identification includes a user login to the mobile communication interface, such that the mobile communication interface includes a plurality of user preferences stored therein.

The method and system further includes receiving user communication input via the mobile communication interface to modify the bi-directional communication, wherein the modify instructions includes one or more of a squelch instruction, a change channel instruction, and an interaction group modification command. In one embodiment the squelch instructions are predicated on one or more of the following: a distance factor, a contacts factor, an individual user factor, and a reputation score factor.

The method and system further includes receiving a user communication selection, via the mobile communication interface and transmitting at least one communication channel based on the user communication selection. In this embodiment, the user communication selection includes one or more of explicit users from a contacts list, a location indicator, a proximity distance indicator, a content indicator and a broadcast indicator.

BRIEF DESCRIPTION OF THE DRAWINGS

A better understanding of the disclosed technology will be obtained from the following detailed description of the preferred embodiments taken in conjunction with the drawings and the attached claims.

DETAILED DESCRIPTION

Various embodiments are described herein, both directly and inherently. However, it is understood that the described embodiments and examples are not expressly limiting in nature, instead illustrate examples of the advantageous uses of the innovative teachings herein. In general, statements made in the specification of the present application do not necessarily limit any of the various claimed inventions and it is recognized that additional embodiments and variations recognized by one or more skilled in the art are incorporated herein.

Figure 1:
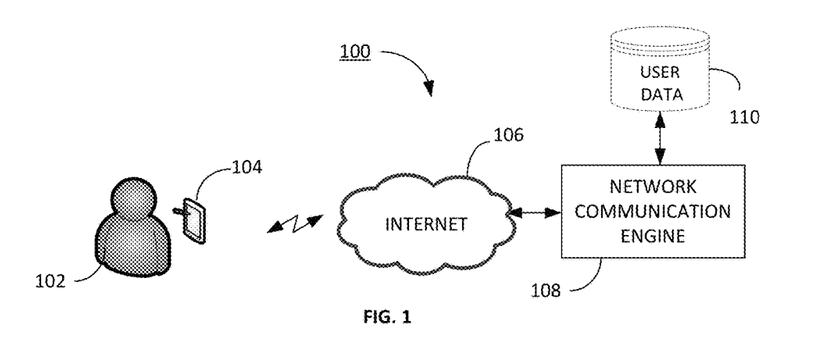
FIG. 1 illustrates one embodiment of a computing system providing for muted bi-directional multi-party communication.

FIG. 1 illustrates one embodiment of a multi-party communication system 100 wherein a single user 102 with a mobile computing device 104 communicates via a network 106. The system 100 includes a network communication engine 108 having user data 110 associated therewith. It is recognized that additional aspects to the system 100 have been omitted for brevity purposes only, wherein the functionality of such system is described in further detail below.

The user 102 may be any suitable type of user, typically an individual looking to engage in audio communication with one or more other users across the network. The user 102 may be stationary, such as sitting at a home computer or at any other stationary location using a computing device to communicate. The user 102 may also be mobile, for example, riding in a vehicle seeking parties to communicate with while driving or otherwise traveling.

The computer device 104 may be any suitable device, including but not limited to a mobile phone, a smart phone, a tablet computer, a laptop or mobile computer, a desktop computer, a television set-up box, a video gaming system, a smart television, and/or a vehicle in-dash electronic communication system. The computer device 104 includes functionality for network connectivity, whether via wired or wireless communication. In one embodiment, the device 104 includes connectivity via a mobile or cellular network, connecting to a mobile base station routing the connectivity over a network using known communication techniques. In another embodiment, the device 104 may include short-range wireless (e.g. Bluetooth) or other wireless connectivity (e.g. a local wireless network or hotspot) directly connecting the device 104 to a network via a wireless router. In another embodiment, the device 104 may additionally be directly or indirectly wired to a network for communication across the network.

The network 106 is illustrated herein as the Internet, but it is recognized that this network may be any suitable communication network for routing and/or directing communication between the user 102 and the engine 108. The network 108 may be a virtual private network (VPN), may be a dedicated network from a networking service provider, may be a phone network or any other forms of data transfer and communication thereacross. The forms of data exchange and communication between various networks are known in the art and are omitted from brevity purposes only.

The network communication engine 108 may be one or more processing devices operative to perform processing operations described herein. The devices of the engine 108 may be centrally located or displaced in a network-computing environment. The engine 108 is operative to perform various processing operations in response to executable instructions (not expressly illustrated) provided from a computer readable medium. The computer readable medium may be any suitable medium capable of having the instructions stored thereon such that engine 108 is operative to receive and read instructions therefrom. The computer readable medium may be local or accessed via a network connection.

Further within the system 100 includes the user data database 110. This database 110 may be any suitable type of data storage device including local or networked storage. The user data 100, as described in further detail below, includes data relating to the user 102 and communication preferences, as well as other data providing for the muted bi-directional communication. The system 100 of FIG. 1 illustrates a general embodiment allowing for a user 102 to access the engine 108 and both begin a muted bi-directional communication system and continue engagement in the session.

As used herein, a muted bi-directional communication session provides for multiple users to communicate across a single channel. Prior techniques failed to provide cogent multi-party communication because the inability to mute non-speaking parties created a wall of noise. Multiple parties speaking at once creates an environment where no one can hear other parties, therefore the muted bi-directional communication provides muting a user's line unless that user actively engages the network for communication. As described herein, additional visual indicators provide for user display of the multiple party communication, including indicators of which party is actively engaging the channel and thus allowing other parties to remain muted until the channel is open for communication.

The muted bi-directional communication provides a similar or emulated communication technique as found in citizen band (CB) radio communication, wherein a user activates the outgoing communication to engage communication onto the network, but otherwise remains muted in a listening embodiment. Whereas, the present method and system improves and updates such CB-type communication harnessing the functionality available via network communication and software execution found on mobile computing systems.

Figure 2:
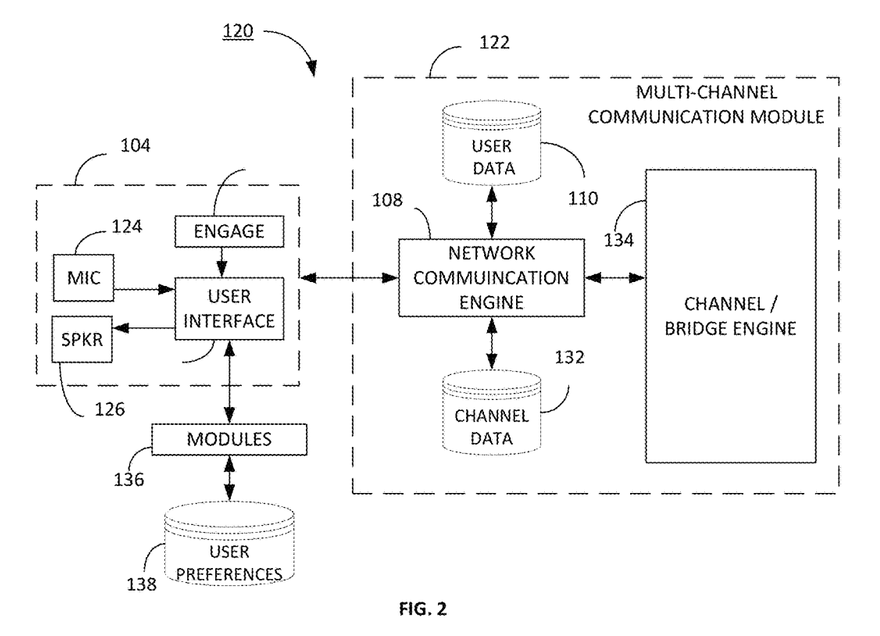
FIG. 2 illustrates a further embodiment of processing components within the system of FIG. 1.

FIG. 2 illustrates a system 120 including the user device 104 and a multi-channel communication module 122. The user device 104 includes a microphone 124 and speaker 126, an engage input command 128 and a user interface 130. The multi-channel communication module 122 includes the user data database 122, the network communication engine 108, channel data database 132 and a channel/bridge engine 134.

Further within the system 120 are user connection modules 136 and user preferences 138. As illustrated herein, the modules 136 and preferences 138 are not expressly illustrated within the device 104 or the mobile 122, but it is recognized that these elements may be disposed at either location, or in a completely separate location. As described below, the modules 136 and preferences 138 provide for user communication connection and various engagement activities, therefore, these elements may be network based or may be locally housed on the computing device. Moreover, the system 120 omits the communication interface and networking elements as illustrated in FIG. 1, whereas it is recognized by one skilled in the art that the module 122 and the device 104 communicate across a wired or wireless connection using known communication techniques.

In the user device 104, the microphone 124 and speaker 126 may be standard devices embedded within the device, or in another embodiment may be disposed in external systems connected to the device 104. In one example, if the user device 104 is a smart phone connected to a vehicle in-car wireless (e.g. Bluetooth®) system, the speaker 126 and microphone 124 may be embedded within the vehicle instead of the device 104. Similarly, the user 104 may incorporate a headset or other speaking device, including for example a handheld speaker typically associated with a CB radio electronically connected to the mobile device with a push-to-talk button.

The engage device 128 may be a touchscreen interface found on the mobile device or can be another interface element incorporated within existing systems. By way of example, in a vehicle with in-car telephone functionality, the engage interface 128 may be a push-to-talk button found on a steering wheel or a tactile in-dash interface. In another embodiment, the push-to-talk may be a voice-activated system allowing the user 102 to indicate the intention of such engagement on the network.

The user interface 130 may be a stand-alone application running on the device 104 or may in another embodiment be an application available through a browser or other networked interface, including primary execution on a network or cloud-based operation. For example, the interface may be executable in local programming code suitable for the operating device, or may in another embodiment be network based such as an applet, HTML 5.0 or other suitable instruction set for performing operations described herein.

The user interface 130, as described in further detail, including various exemplary screen shots below, allows a user to access one or more communication channels and manage communication across that channel.

In the multi-channel communication module 122, the network communication engine 108 provides functionality for interacting with the user device 104, including presenting interface functionality as necessary. The engine 108 further manages various aspects of multi-channel communication, including detection of available users, available channels, user preference for channels, in-channel communication, muted and active channel engagement from multiple parties, channel moderation, among other operations described herein and as recognized by one skilled in the art.

Operational details usable by the engine 108 include user data stored in the database 110, including for example the user login information, location information, reputation information, social networking or contact information, etc. The channel data stored in the channel database 132 includes information on available channels for multi-party communication. As described further below, this can include not only existing channels, but user-generated channels based on any suitable factor or factors, including for example topics of interest, geography, general communication, etc.

A further embodiment of the multi-channel communication module 122 includes the network communication engine 108 performing logical operations to enhance the user experience. As described herein, the user via the user interface can set squelch functionality, including for example but not limited to squelching communication with users outside of a particular range (e.g. distance from the user) or having a reputation score below a user-defined threshold. Whereas, the user via the interface may be unaware of the large scope of potential other users for communication in expanding the squelch factors or inversely, the user may be able to be provided with a more intimate user experience by reducing the distance or raising the reputation factor.

For example, suppose a user sets a distance factor to 20 miles, but four additional users are located 21 miles away, the network communication engine 108 may therein augment the user's selection based on one or more logical algorithms for enhancing the user experience. One embodiment of the logical algorithm may include a sequential comparison of the potential users by expanding or contracting a particular squelch factor. As the adjustments of the squelch factors are performed, the different user experience numbers are generated and thus a comparison can be determined to modify or other overrule the user interface selection to provide the enhanced user selection based on the network-adjusted squelch factor(s).

The channel/bridge engine 134 operates to connect the user to the proper channel. In one embodiment, the engine 134 provides any number of gates, embedded in hardware and/or software, for connecting the user with the intended channel. The user can be placed on a selected channel and then the engine 108 operates to manage the communication across that channel. The channel/bridge engine 134 receives the user request to join a channel and therein engages into the channel so that the user may therein perform the muted bi-directional communication thereon.

The modules 136 are various aspects of the multi-channel communication, including user functionality for controlling the communication. As described further below, these modules may include active display of preferred channels, hiding or muting of users below defined reputational scores, establishing of a location identifier for the user, regardless of the actual location of the user, among other features. Additionally, the user preference database 138 stored user preference data usable for the modules 136 and improving the user interface experience. Such preference data can indicate contact information, preferred communication members, preferred channels, preferred locations, etc.

It is further noted that various embodiments provide for different user transmission of outgoing communications. One embodiment emulates a pure citizen band radio transmission where the user's outgoing transmissions are sent to all other users active on the channel. In other embodiments, the user may include preferences to avoid transmission to various users, such a blacklist or blocked user list, or similar squelch features applicable to outgoing communications.

Figure 3:
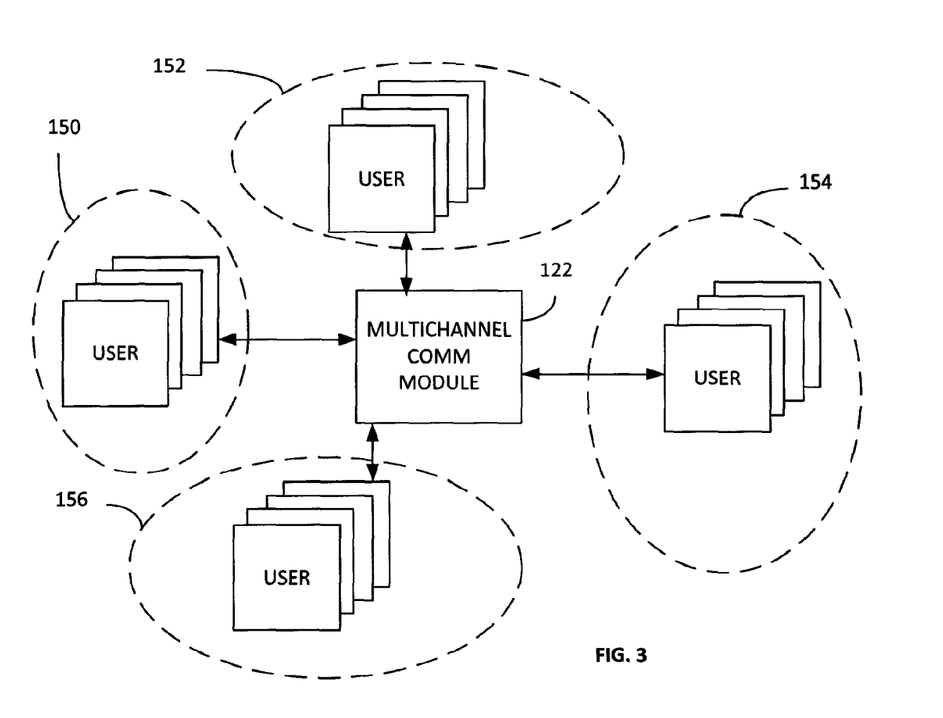
FIG. 3 illustrates a communication display illustrating the multi-party communication interactivity.

As described herein, FIGS. 1 and 2 provide for an individual user accessing and engaging the communication engine 108 and thus joining or otherwise modifying communication on a channel. FIG. 3 illustrates a broader perspective of multiple users communicating with each other in muted bi-directional communication in various groups, illustrated herein as groups 150, 152, 154 and 156. The users in the groups may be disposed at any particular location and thus interact across a networked location, not limited by geographical transmission restrictions previously found in CB radio techniques.

As noted above, the grouping may be based on any suitable grouping technique. For example, group 150 may be users in the western region of the United States, group 152 are users in the northern Midwest region, group 154 are located in the east coast and group 156 are users located in the southern region of the United States. In another example, users 150 may be Republicans, group 152 are Green party members, group 154 are Democrats and group 156 are Independents.

Therein, via the multichannel communication module 122, the users within their respective groups are able to engage muted bi-directional communication. Moreover, users are able to switch groups based on active engagement of the user interface 130 and functional operations of the network communication engine 108 of FIG. 2.

Figure 4:
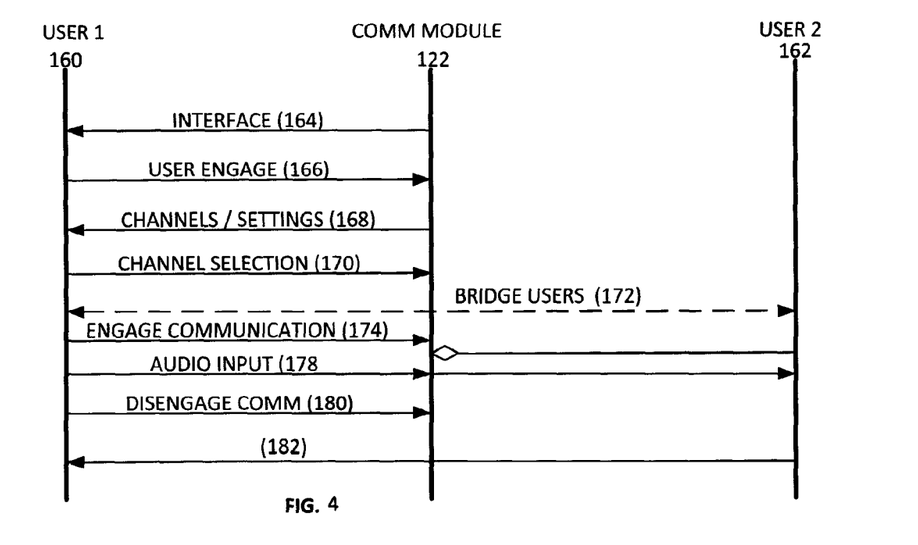
FIG. 4 illustrates a data flow diagram for one or more embodiments of multi-party communication with muted bi-directional communication.

FIG. 4 illustrates a data flow diagram representing one embodiment of the muted bi-directional multi-channel communication described herein. In this data flow diagram, communication and data exchange occurs between a first user 160, the communication module 122 and a second user 162. In one embodiment, the module 122 provides interface information, step 164, to the first user 160. As noted above, the interface information may be provided via a browser or other type of communication interface, whereas in another embodiment the interface functionality may already be disposed on the user-computing device.

The user 160 therein engages, step 166, the communication module 122. This engagement includes the user submission of login or other identifier information. In one embodiment, the user has an existing account with the module 122, but it is recognizes that absent an existing account, the user 160 may be instructed to generate an account providing account information, including user information, a handle or communication name, and other information as necessary to verify the user, including age.

The module 122 therein, in this embodiment, submits channel/settings information, step 168, to the user 160. In one embodiment, the channel listing may be locally stored by the user, but the information 168 may include updating information to indicate which channels are active, list of users of various channels, etc. By contrast, another embodiment allows for the transmission of this channel-specific information to the user 160, so that via the user interface, the user can view the available channels.

Figure 5:
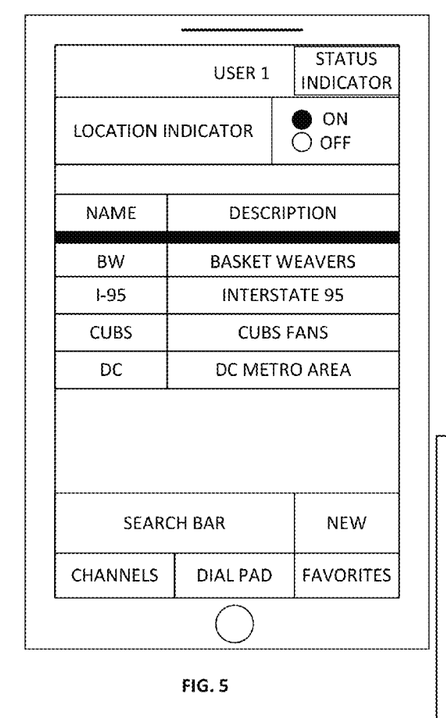
FIGS. 5-11 illustrate representative screenshots as visible on a mobile computing device for user interaction with the muted bi-directional communication system.

FIG. 5 illustrates a sample screenshot of a user interface as visible on a mobile computing device. In this example, the interface includes a display of the user's name, a status indicator if the user is active on a channel, a location indicator and a toggle field to indicate if the location identifier is on (e.g. the mobile device is transmitting or otherwise using location information). The interface further includes a display of available channels, herein the example of a name and a description. This example includes 4 possible channels, based on the user preferences. A first channel is for users interested in the art of basket weaving. A second channel relates to the geography of traveling on Interstate 95, the third channel is for fans of the Chicago Cubs and a fourth channel is for users location or interested in the Washington, D.C. metro area.

The interface further includes touch interface functionality of a search bar, a new button for generating a new channel, a channel viewer bar, a dial pad and a favorites indication toggle button.

With reference back to FIG. 4, the user therein selects a channel via the user interface and sends the channel selection, step 170, to the module 122. The module 122 therein bridges the user 160 with the second user 162 via the channel. Wherein, in one embodiment, the second user 162 may be actively engaged with any number of other users on the channel, the first user 160 is then granted permission for communication on the channel.

Figure 6:
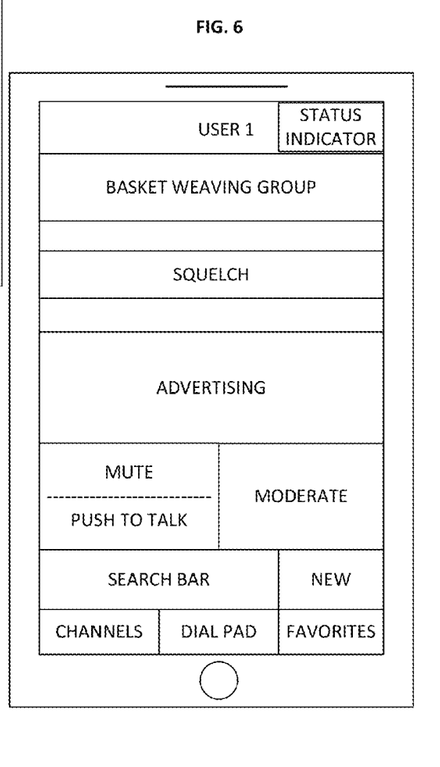

FIG. 6 illustrates a sample screenshot of a user interface wherein the user has selected the basket weaving group. The interface includes a squelch button for limiting or otherwise modifying the interactivity. The interface further includes, in one embodiment, advertising. As part of the muted bi-directional communication, the interface includes an engagement button, here indicating a mute and push to talk display. When the user is not engaged, the device is muted to allow the bi-directional communication. One embodiment includes inclusion of a moderate button allowing a person to either moderate a channel, e.g. exclude certain users, or report users or behavior to a moderator.

Figure 7:
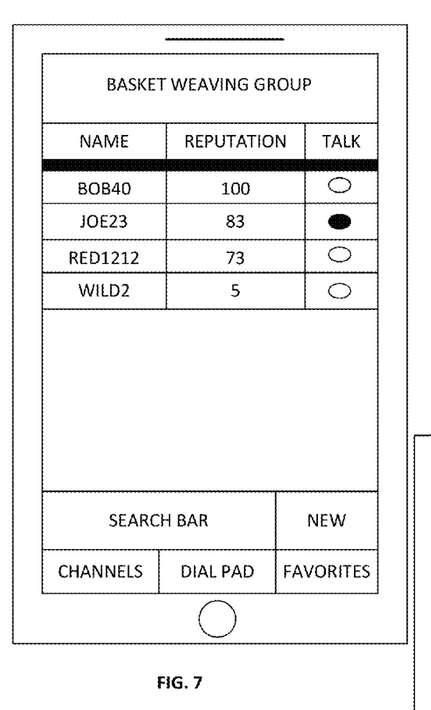

FIG. 7 illustrates another aspect of the muted bi-directional system, the inclusion of reputation or user preferences. In the user interface, the user can view the active members in the channel, as well as a reputation score. The reputation score may be specific to the user or can be specific to a channel. In the exemplary display, there are four other users in the channel each having different reputation scores. Also visible is a toggle indicator indicating which user is engaging the network to speak.

Figure 8:
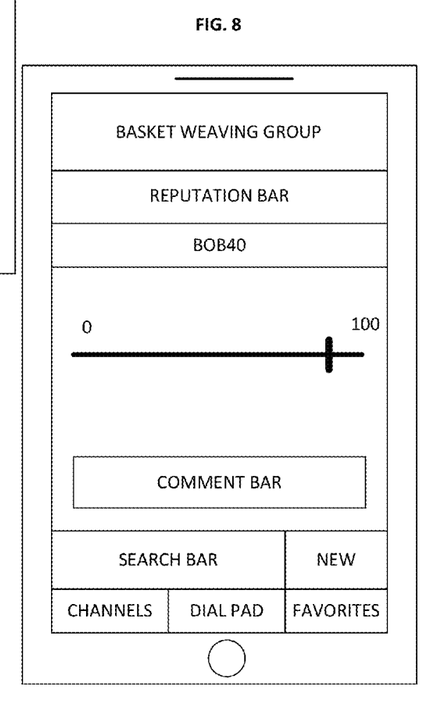

FIG. 8 illustrates another aspect of the reputation, including the user setting of a reputation or the user contribution to a reputation score. In this exemplary interface, the reputation indicator includes a sliding bar between a low value, in this example 0, and a high value 100, such that the user can toggle or slide the bar between the values to set a reputation score. The user may also add comments as applicable.

With reference back to FIG. 4, the user 160 may therein seek to engage on the communication channel. The user submits an engage signal, step 174, e.g. activating the push to talk button in the embodiment of FIG. 6, which then opens the channel for other users to then hear the user 160 audio. As illustrated in data flow diagram, one embodiment includes the modulation or regulation of other users while a user engages the channel. Therefore, the communication 176 by the second user 162 does not pass through the communication module 122 to the first user 160 while the first user has engaged the channel. This regulation allows for the prevention of the excess noise or multi-party concurrent talking on the channel. In another embodiment, this allows for the muting of the first user 160 so that there prevents audio interference or feedback when the first user speaks.

Thus, step 178 allows for the first user 160 to share audio across the channel, such audio is then distributed to the second user 162 and all other users on the channel. The user 160 therein disengages communication, step 180, to open the channel back up for the other users on the channel. Therein, the first user 160 is operative to receive further communications from the second user 162, step 182, when the channel is open.

The data flow operations continue in similar operating techniques for multiple channel users, until users disconnect from the channel or disconnect from the module 122.

The user may additionally squelch or otherwise modify the interaction experience. As noted above, a user may filter other users on the channel based on reputational scoring, e.g. blocking his or her mobile device 104 from receiving audio from users having a score below a threshold reputational score. In another embodiment, the user may selectively filter users with whom the person may engage on the channel.

Figure 9:
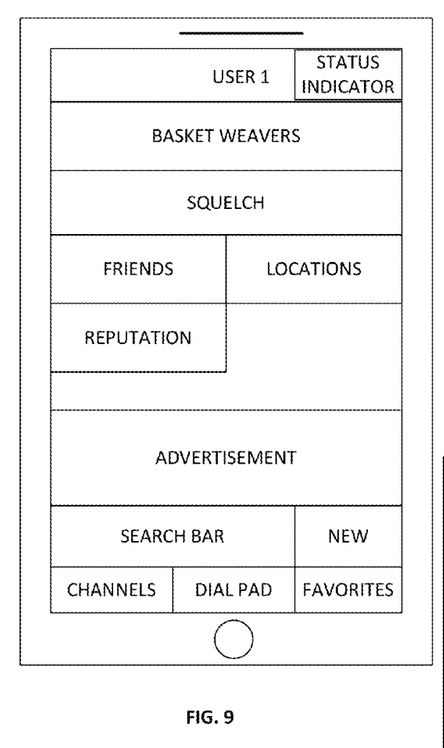
Figure 10:
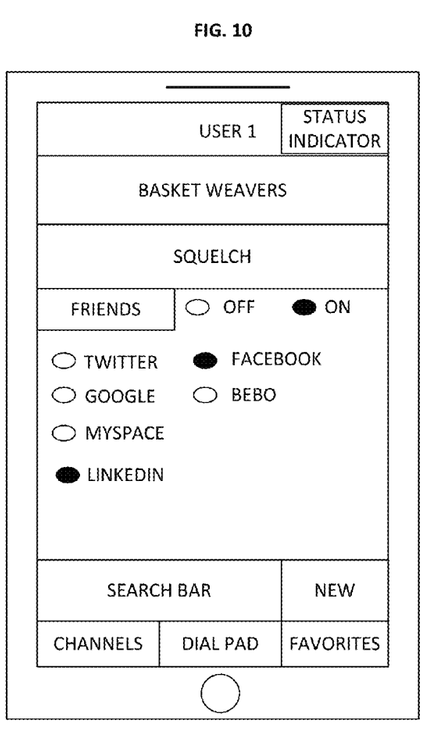

FIG. 9 illustrates a sample screen shot of the user interface including filtering options. In this embodiment, the filter can be based on friends, a location or a reputation score. FIG. 10 illustrates a sample secondary screen upon the selection of the friends filter, including filtering features and various social media or other contact lists.

Figure 11:
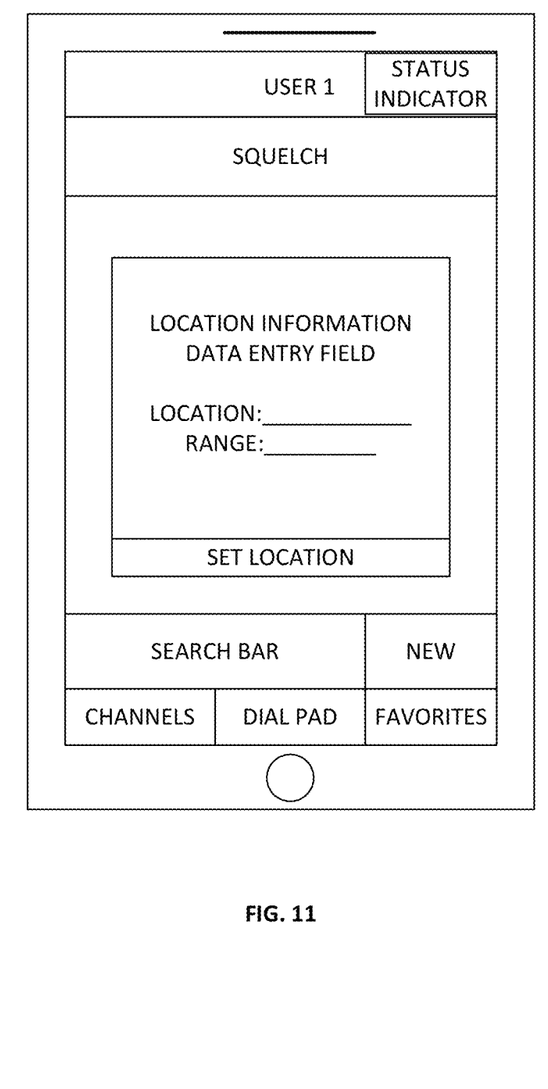

FIG. 11 illustrates a screenshot of one embodiment based on location information. The present method and system can use the actual location of the user and/or user device, or in another embodiment the user can select a particular location. For example, if a person is originally from a foreign country and misses general conversation with people from his home country, the user may select the geographic location as being in the home country, even though the individual may be located anywhere in the world.

Similar to geography, the user may set a zone from which to chose possible users, so that the geographic discussion is more centrally located. One example may be a user selected a zone of Interstate 95, to speak with fellow users on Interstate 95. The user may wish to limit the zone to a 25 mile radius to better engage local users. Whereas a user in Jacksonville, Fla. may not be interested in possible construction or road delays in Delaware along Interstate 95, but rather is concerned with tourist traffic between Jacksonville and Daytona Beach. Thus, the user can set the geographic zone as appropriate.

Further embodiments herein are provided as follows:

Channel Connections can include Interstate communication. The Classic CB Radio, with a twist. CB radios let drivers keep in touch with each other for helpful traffic information but it also allowed for some very fun, albeit sometimes a bit edgy, discourse between random strangers, from the comfort of their own cars. The present method and system facilities everything the old school CB did, but without the need for specialized equipment or bulky antennas.

Channel connections can include Facebook groups/Twitter Lists/Google+ Circles. By connecting to various Social Networking systems you can either join or create a channel that is only open to members of your Group/List/Circle. As long as the other user is also connected to the same Social Network subset you'll be able to talk. Think of this like a standing open conference facility just for your group.

Channel connections can include Subject/Interest. A variety of pre-existing channels exist for a variety of subjects or interests. Users can also submit requests for new, permanent, interest focused channels.

Channel connections can include Personal channels. You can establish a new channel any time! Just give it a name and a few details and your own new channel is up and running!

The system supports a virtually unlimited number of users in a channel however this would make for a noisy channel so several 'filters' are introduced to allow for a 'squelching' of the conversation. This squelching feature can operate on several factors.

Squelch (Filters) can include Distance. Using location awareness from mobile devices or the "geolocation" of your computer, or by a real or "virtual" location (why not virtually be wherever you like!), and then you can turn the squelch up or down and limit the conversation to only other users within your desired range.

Another squelch (filter) includes Facebook Friends/Twitter Follows/Circles. One great way to cut out the chatter is to limit who you are talking with to just your 'friends'. Even if you are in a busy channel you can flip the social switch, and only hear and be heard by people in your linked social networks.

Another squelch (filter) includes Individual (+/−). Some users can be annoying. Or, you might want to listen, but not to them right now. Click them out of your conversation. You can mute any individual in a channel either temporarily or permanently. They will just not exist to you any more. Gone!

Another squelch (filter) includes Reputation Score. Those users we just got rid of are likely annoying to everyone else as well. Put a vote in on their reputation! With the reputation filter you can set a minimum reputation level for users you will have to hear. Oh yeah, and vote the good folks up, too!

The method and system includes Talk Modes. One talk mode is a Push to talk (PTT). Just like the old school CB. Hold a button down (which one will depend on the device you have), and then talk. Otherwise you are in listen only mode.

Another talk mode is normal, just like a telephone call today. There is also speakerphone, just like a speakerphone call today—hands free but in the cloud.

A user may use a headset, just like a headset call today—including support for Bluetooth and Wired headsets on phones and computers.

Because sometimes you would rather not be heard, there is a mute functionality. Similar to the PTT mode but when mute is off you are back in whatever your previous mode was.

Broadcast Mode (Stream out with no input). Say you really want to be heard, and want your own soapbox. Broadcast mode is for you. Suddenly anyone can have his or her own 'radio station'. What you do with it is up to you and those two little dudes on your shoulders.

In one embodiment, in exchange for having a great reputation the user can gain moderator privileges in the public channels. Moderators are given ModPoints that they can use to remove people from a channel for a period of time or if they feel really strongly that the person is a liability to the community they can use a few more ModPoints to report them for review. ModPoints come from a variety of sources but primarily from having a great reputation!

A user may also generate and control the user's own channel. When you are in a channel that you created you can manage who can listen or speak. Manage content. Control everything via the user interface.

Therein, the present method and system improves upon the user audio experience by recreating a citizen band type communication system using existing networked and computing devices. The present method and system allows for multi-party communication on common channels without geographic restrictions previously found in CB radio techniques. The inclusion of selected channels allows the user to tailor the topic for discussion. Moreover, the inclusion of filtering or squelching functionality allows the user to better filter the other users with whom communications occur, thereby enhancing the user experience.

Figures presented herein are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, Applicant does not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

What is claimed is:

1. A method for multi-party communication comprising:
    connecting to a network communication engine from a mobile communication interface operating on a mobile device;
    providing a user identification and a location indicator to the network communication engine from the mobile device;
    displaying in the mobile communication interface a plurality of communication channels based on the user identification, at least one user preference associated with the user identification, and the location indicator, wherein the communication channels are open communication channels facilitated by the network communication engine for active audio communication between the user identified by the user identification and additional users;
    receiving a user selection of a selected communication channel and transmitting a channel engagement request to the network communication engine requesting connection of the user to the selected communication channel;
    engaging in communication with a plurality of the additional users across the selected communication channel, the communication including:
        providing a visual display on the mobile communication interface of the active engagement of the plurality of additional users actively engaging communication on to the network such that as each of the users are providing an audio input on to the network the visual display associated with the user illuminates;
        squelching one or more of the plurality of additional users in a dynamic manner such that the one or more of the plurality of additional users are restricted from active communication, as well as providing a visual display of the squelching on the mobile communication interface, including updating the visual display on the mobile communication interface of the squelched one or more users; and
    in response to a user selection command, generating a new channel and transferring the user and a selected group of the additional users to the new channel.

2. The method of claim 1, wherein the user identification includes a user login to the mobile communication interface.

3. The method of claim 1 further comprising:
    providing a user communication selection of a plurality of the communication channels, via the mobile communication interface.

4. The method of claim 3, wherein the determination of the plurality of communication channels for the user communication selection includes at least one of: one or more explicit users from a contacts list; a location indicator, a proximity distance indicator; a content indicator and a broadcast indicator.

5. A system for multi-party communication comprising:
    a computer readable medium having executable instructions stored thereon; and
    a computing device including at least one processor, in response to the executable instructions, the processor is operative to:
    connect to a network communication engine from a mobile communication interface operating on a mobile device;

provide a user identification and a location indicator to the network communication engine;

display in the mobile communication interface a plurality of communication channels based on the user identification, at least one user preference associated with the user identification, and the location indicator, wherein the communication channels are open communication channels facilitated by the network communication engine for active audio communication between the user identified by the user identification and additional users;

receive a user selection of a selected communication channel and transmit a channel engagement request to the network communication engine requesting connection of the user to the selected communication channel;

engage in communication with a plurality of the additional users across the selected communication channel, the communication including:

providing a visual display on the mobile communication interface of the active engagement of the plurality of additional users actively engaging communication on to the network such that as each of the users are providing an audio input on to the network the visual display associated with the user illuminates;

squelching one or more of the plurality of additional users in a dynamic manner such that the one or more of the plurality of additional users are restricted from active communication, as well as providing a visual display of the squelching on the mobile communication interface, including updating the visual display on the mobile communication interface of the squelched one or more users; and in response to a user selection command, generate a new channel and transferring the user and a selected group of the additional users to the new channel.

6. The system of claim 5, wherein the user identification includes a user login to the mobile communication interface.

7. The method of claim 1, wherein the squelching includes filtering the additional users based on a contacts list, whereby the user can dynamically squelch additional users outside of the contacts list.

8. The method of claim 1, wherein in generating the new channel, the user and the selected group of additional users transferred to the new channel are exclusive to the new channel.

9. The method of claim 1 further comprising:

transmitting an invitation to new user in the new channel.

10. The method of claim 1, wherein the user and the additional users are assigned a reputation score, the method further comprising:

squelching one or more of the additional users based on the reputation scores assigned to the additional users.

11. The system of claim 5, wherein the squelching includes filtering the additional users based on a contacts list, whereby the user can dynamically squelch additional users outside of the contacts list.

12. The system of claim 5, wherein in generating the new channel, the user and the selected group of additional users transferred to the new channel are exclusive to the new channel.

13. The system of claim 5 further comprising:

transmitting an invitation to new user in the new channel.

14. The system of claim 5, wherein the user and the additional users are assigned a reputation score, the squelching includes squelching one or more of the additional users based on the reputation scores assigned to the additional users.

* * * * *